Figure 1:
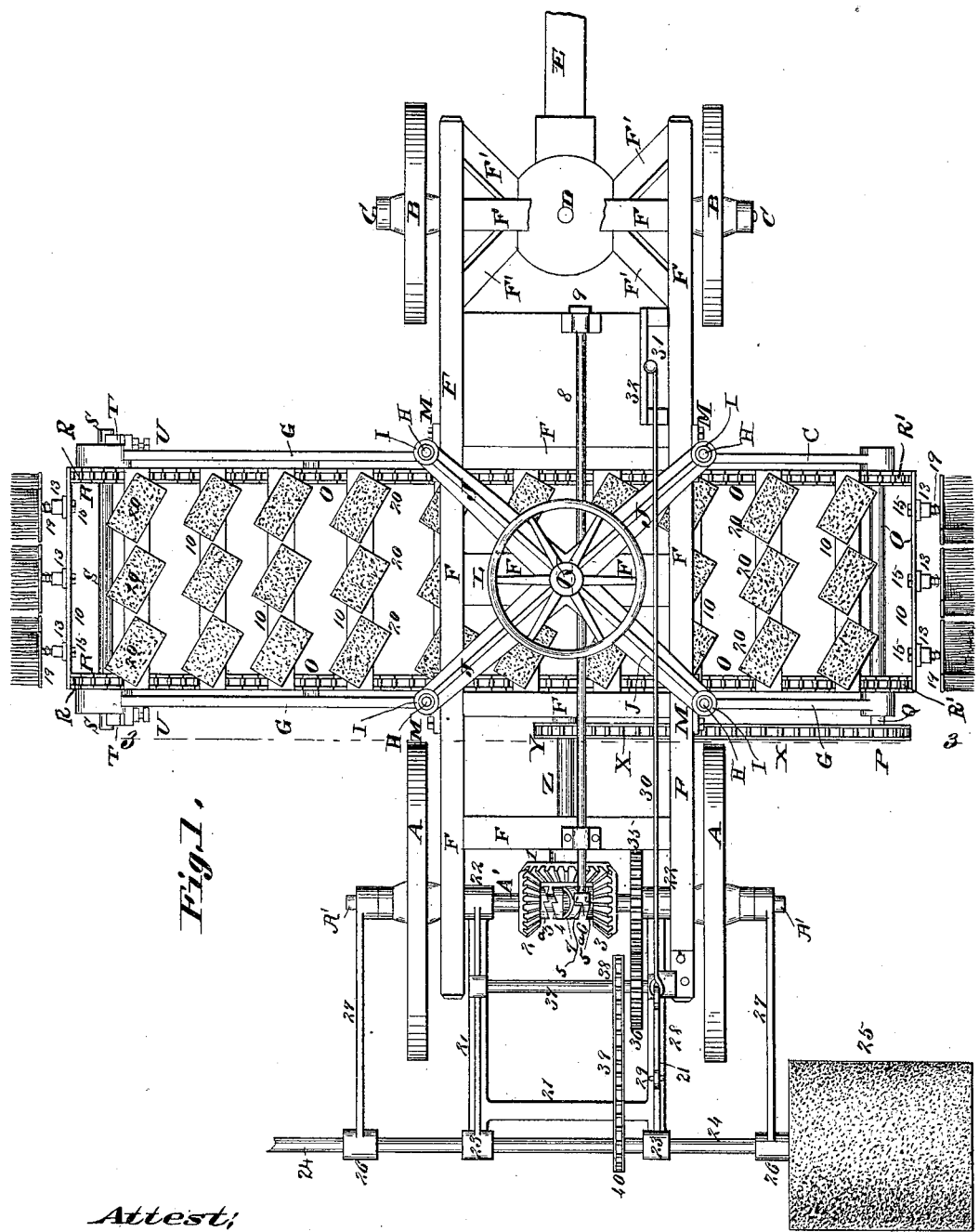

(No Model.) 2 Sheets—Sheet 1.

C. CHRISTOPH.
STREET SWEEPING MACHINE.

No. 354,011. Patented Dec. 7, 1886.

Attest:
Geo. L. Wheelock
L. H. Hopkins

Inventor:
Charles Christoph
By Knight Bros.
Atty (No Model.) 2 Sheets—Sheet 2.
C. CHRISTOPH.
STREET SWEEPING MACHINE.
No. 354,011. Patented Dec. 7, 1886.
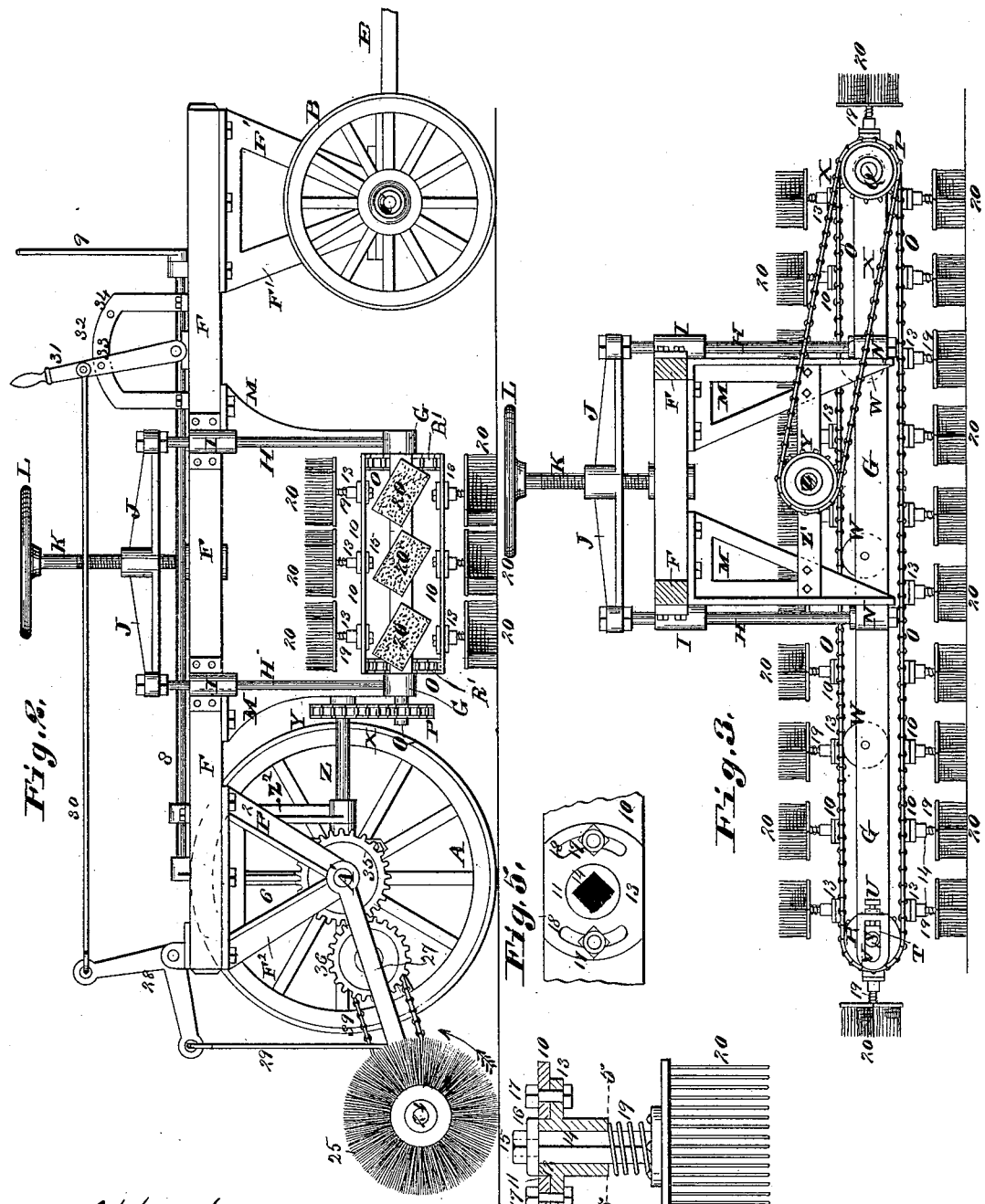

UNITED STATES PATENT OFFICE.

CHARLES CHRISTOPH, OF ST. LOUIS, MISSOURI.

STREET-SWEEPING MACHINE.

SPECIFICATION forming part of Letters Patent No. 354,011, dated December 7, 1886.

Application filed April 6, 1885. Serial No. 161,255. (No model.)

*To all whom it may concern:*

Be it known that I, CHARLES CHRISTOPH, of the city of St. Louis, in the State of Missouri, have invented a certain new and useful Improvement in Street-Sweeping Machines, of which the following is a full, clear, and exact description, reference being had to the accompanying drawings, forming part of this specification.

The machine is drawn along the street and sweeps the dust toward or to the side thereof and leaves it in heaps.

Figure 1 is a top view of the machine. Fig. 2 is a side view of the same. Fig. 3 is a transverse section at 3 3, Fig. 1. Fig. 4 is an enlarged detail, part in section, showing the manner of attaching the shanks of the brushes to the bracket-bars upon the endless chains. Fig. 5 is a section at 5 5, Fig. 4, looking upward.

The machine is supported on hind wheels, A, and fore wheels, B. The hind wheels are fast upon their axle A', which forms a shaft by which the sweeping appliances are driven. The fore axle, C, turns on a king-bolt, D, or fifth-wheel, as usual with four-wheel vehicles, and to the axle is secured a tongue, E, to which the draft-animals are harnessed.

The body of the machine consists of an elevated frame, F, supported on the axles by bolster-frames F' and F², to the latter of which the axle-shaft A' has journal-bearing.

G is a frame, having capacity for vertical adjustment in suitable guides of the frame F. The frame G extends transversely to the frame F, and is supported on four vertical rods, H, working in guides I of the frame F, and being secured at the upper ends to the legs of a spider, J. The spider J has at its center a screw-threaded socket, in which works a supporting-screw, K, whose lower end is stepped on the frame F.

L is a hand-wheel, by which the screw is turned to raise or lower the frame G.

M are guide-braces fixed to the frame F, and serving to prevent any lateral or longitudinal movement of the frame G relatively to the frame F.

N are parts of the frame G, bearing against the guide-braces.

O are endless chains, carrying the brushes by which the dust and mud are moved toward the side of the street. These chains are carried upon sprocket or other wheels R R' upon shafts Q S, having bearing at the ends of the frame G. Of these shafts Q is the drive-shaft, carrying a sprocket-wheel, P, receiving rotary motion by a drive-chain, X, upon it. At the opposite end of the frame G from the shaft Q the endless chains are supported on wheels or drums R upon a shaft, S. The shaft S has bearing in boxes T, which have means for adjustment to stretch the chains O. The means shown for this adjustment consist of screws U, which bear against the inner ends of the boxes, and which on being turned forward force the boxes T along the slots V, in which they have bearing. The upper parts of the chains are supported on rollers W. The sprocket-wheel P carries the drive-chain X, which passes around or over a sprocket-wheel, Y, that is fast upon the shaft Z. The shaft Z is supported at its forward end in a cross-bar, Z', secured to the adjacent guide-braces, and at its rear end in a hanger, Z², depending from a cross-bar of the frame F. The shaft Z carries at its rear end a bevel cog-wheel, 1, which is in constant engagement with two similar wheels, 2 and 3, which are loose between collars on the hind axle-shaft, A'.

4 is a clutch-collar upon the axle-shaft A', and which has spline-connection with the axle-shaft, so as to turn therewith, and to have endwise movement thereon. The ends of the clutch sleeve or collar 4 are made with ratchet or other teeth 5, which engage similar teeth, 5ª, upon the hubs of the wheel 2 or 3 when the sleeve is moved along the axle-shaft to the right or left. By this device it will be seen that the bevel-cog wheel 1, with its shaft Z, may be caused to turn in either direction, as may be desired.

When the clutch-sleeve 4 is in intermediate position, the clutch-connection is not made with either of the wheels 2 or 3, and consequently the shaft Z remains at rest. The clutch-sleeve is shifted by an arm, 6, which is forked at 7, and engages a circumferential groove of the sleeve in the usual or in any suitable way. The arm 6 is upon a rod, 8, which extends forward, and is provided with a lever, 9, within reach of the driver of the machine.

Upon the endless chains O are cross-bars or bracket-bars 10, which extend transversely from chain to chain. Referring to Figs. 4 and 5, the bracket-bars have round sockets 11, in which fit round projections 12 of the brackets 13. The bracket has an angular socket, in which fits the angular shank 14 of the brush. Upon the screw-threaded end of the shank is a nut, 15, which bears upon a washer, 16, that in turn bears against the part 12 and holds the shank in the angular socket. The bracket 13 is secured to its bar 10 by two bolts, 17, which pass through slots 18 of the flange. These slots are curved concentrically with the round socket, so that when the bolts are loose the bracket may be turned to change the obliquity of the brush 20 upon the bar 10. A still greater change may be made by removing the shank 14 from the socket and returning it in another position.

19 is a spiral spring, which bears at one end against the bracket 13 and at the other end against the head of the brush, the spring tending to press the brush outward from the bracket.

The brushes 20 are shown in oblique position, this position being preferred, as when the brushes are long enough the corners will overlap each other on lines parallel with the direction in which the machine travels.

21 is a frame hung upon the axle-shaft A', the axle-shaft turning in the boxes 22 at the front of the frame. At the rear end of the frame are boxes 23, in which turns a shaft, 24, carrying at the end a cylindrical brush, 25, which rotates in the direction indicated by the arrow, and thus sweeps forward the material left by the other brushes, (the brush 25 being in line with such deposit.) The shaft 24 has bearing also in the boxes 26 of the arms 27, which are hung on the outer ends of the axle-shaft A'.

The frame 21 may be raised on the axle-shaft A' as a fulcrum, and thus the brush 25 is lifted from the ground when a heap of the material has been gathered, leaving the heap, and being allowed to descend for the gathering of another heap, and so on. As means for the elevation of the brush, I show a bell-crank lever, 28, fulcrumed to the rear end of the frame F, one arm of which is connected by a rod, link, or chain, 29, to the frame 21, the other arm of the lever being connected by a rod, 30, to a hand-lever, 31, which works beside a guide-frame, 32, by connection to which the lever may be held in any position. For this connection I show pin-holes 33 and 34 in the lever and frame, respectively. The connection may be made by any suitable means.

The shaft-axle A' carries a spur-wheel, 35, which engages a spur-wheel, 36, upon the counter-shaft 37, said shaft turning in bearings of the frame 21. The shaft 37 carries a sprocket-wheel, 38, connected by a drive-chain, 39, with a sprocket-wheel, 40, upon the brush-shaft 24.

I have shown and described the endless chains carrying the brushes as transverse to the frame F, and thus the brushes in the movement imparted by the chains would move in a direction toward the side of the street; but I do not confine myself to the described relative position of the parts, as the frame G, in which the endless chains have bearing, may be set obliquely to the frame F, so as to modify the direction in which the brushes 20 move.

It is intended that the bearings of the frame G in frame F may be such as to allow the frame G to accommodate itself to the slope of the street. The springs 19 and manner of securing the brush-shanks in the bracket allow the accommodation of the brushes to an uneven surface.

I purpose to made the brushes 20 and 25 of wire set in suitable heads, but may use any suitable material.

I claim—

1. The combination of rear wheels, A, front wheels, B, rear axle, A', front axle, C, rear bolster-frames, F², front bolster-frames, F', elevated frame F, supported on the bolster-frames, having rod-guides I, vertical rods H, guide-braces M, secured to the elevated frame, spider J, to which the upper ends of the rods are secured, brush-frame G, having parts N, bearing against the guide-braces and secured to the lower end of the rods, and means for raising and lowering the spider, rods, and brush-frame on the elevated frame, substantially as set forth.

2. The combination, with an elevated frame and means for supporting the same, of the guides I, spider J, brush-frame G, rods H, adjusting-screw K, a shaft at each end of the brush-frame. endless brush-chains carried by the shafts, and mechanism by which one of said shafts is operated from a ground-wheel, substantially as set forth.

3. The combination of a brush-frame, endless chains receiving motion from ground-wheels, and cross-bars having brackets formed with angular sockets provided with brushes having angular stems, substantially as set forth.

4. The combination, in a street-sweeping machine, of endless chains receiving motion from ground-wheels and carrying cross-bars having round sockets, and brackets having brushes and projections rotatable in said sockets, substantially as set forth.

5. The combination of a brush-frame, endless chains, cross-bars having round sockets, brackets having round projections fitting the sockets and adjustable on the cross-bars, and brushes having stems adjustable in the brackets. substantially as set forth.

6. An endless sweep for street-sweeping machines, consisting of chains O, cross-bars 10, having round sockets 11 and slots 17, brackets 13, having round projections 12 and angular sockets, bolts 17, brushes 20, having